United States Patent [19]
Lester

[11] Patent Number: 5,606,870
[45] Date of Patent: Mar. 4, 1997

[54] LOW-TEMPERATURE REFRIGERATION SYSTEM WITH PRECISE TEMPERATURE CONTROL

[75] Inventor: James M. Lester, Redstone, Colo.

[73] Assignee: Redstone Engineering, Carbondale, Colo.

[21] Appl. No.: 386,671

[22] Filed: Feb. 10, 1995

[51] Int. Cl.$^6$ .............................. F25D 17/02; F25B 19/00
[52] U.S. Cl. ............................... 62/434; 62/51.1
[58] Field of Search ............... 62/6, 51.1, 434, 62/467; 165/104.11, 104.15, 104.17, 104.19, 104.21, 104.33, 10

[56] References Cited

U.S. PATENT DOCUMENTS

| | | | |
|---|---|---|---|
| 3,667,246 | 6/1972 | St. Lorant et al. | 62/208 |
| 3,851,173 | 11/1974 | Taylor et al. | 62/51.1 X |
| 3,851,274 | 11/1974 | Solin et al. | 62/51.1 X |
| 4,078,392 | 3/1978 | Kestner | 62/434 X |
| 4,080,802 | 3/1978 | Annable | 62/514 |
| 4,135,571 | 1/1979 | Tamblyn et al. | 62/434 X |
| 4,245,479 | 1/1981 | Richter, Jr. et al. | 62/119 |
| 4,507,941 | 4/1985 | Lester et al. | 62/514 |
| 4,689,964 | 9/1987 | St. Pierre | 62/114 |
| 4,750,338 | 6/1988 | Hingst | 62/514 |
| 4,766,741 | 8/1988 | Bartlett et al. | 62/514 |
| 4,788,829 | 12/1988 | Takemasa et al. | 62/335 |
| 4,825,667 | 5/1989 | Benedict et al. | 62/467 X |
| 4,831,845 | 5/1989 | Oda et al. | 62/51.1 |
| 4,993,230 | 2/1991 | Hingst | 67/512 |
| 5,060,481 | 10/1991 | Bartlett et al. | 62/81.2 |
| 5,073,896 | 12/1991 | Reid et al. | 62/51.1 X |
| 5,119,637 | 6/1992 | Bard et al. | 62/81.2 |
| 5,193,349 | 3/1993 | Laverman et al. | 62/64 |
| 5,197,537 | 3/1993 | Chigira et al. | 62/434 X |
| 5,317,878 | 6/1994 | Bradshaw et al. | 62/6 |
| 5,402,648 | 4/1995 | Longsworth | 62/434 X |
| 5,476,137 | 12/1995 | Ochiai et al. | 62/434 X |

FOREIGN PATENT DOCUMENTS

| | | | |
|---|---|---|---|
| 0685882 | 9/1979 | U.S.S.R. | 62/51.1 |
| 0723323 | 3/1980 | U.S.S.R. | 62/51.1 |

Primary Examiner—Christopher Kilner
Attorney, Agent, or Firm—Sheridan Ross & McIntosh

[57] ABSTRACT

A low-temperature refrigeration system (10) is disclosed for accurately maintaining an instrument (11) with a time varying heat output at a substantially constant predetermined cryogenic temperature. The refrigeration system (10) controls the temperature of the instrument (11) by accurately adjusting the pressure of coolant at a heat exchanger interface (12) associated with the instrument (11). The pressure and flow of coolant is adjusted through the use of one or two circulation loops and/or a non-mechanical flow regulator (24) including a heater (32). The refrigeration system further provides a thermal capacitor (16) which allows for variation of the cooling output of the system (10) relative to a cooling output provided by a cooling source (14).

23 Claims, 7 Drawing Sheets

LOW-TEMPERATURE REFRIGERATION SYSTEM WITH PRECISE TEMPERATURE CONTROL

FIELD OF THE INVENTION

This invention relates generally to refrigeration systems including cryogenic systems and is particularly suited for space-related cryogenic applications.

BACKGROUND OF THE INVENTION

One area of refrigeration that has received considerable attention in recent years is cryogenics. For many applications, there is a growing demand for refrigeration systems that are capable of cooling an instrument to cryogenic temperatures (below about 120° Kelvin) in order to obtain desired performance.

A particularly challenging application of refrigeration systems is cooling spacecraft sensors to cryogenic temperatures. Various spacecraft sensors, such as certain electromagnetic or infrared sensors, require cryogenic cooling or can more readily detect small incident signals from the earth or space when they are cooled to cryogenic temperatures. In addition, spacecraft instruments such as semiconductor lasers, whose frequencies are extremely sensitive to temperature, require a refrigeration system that is capable of maintaining such devices at a predetermined cryogenic temperature with highly accurate temperature stability. Maintaining temperature stability of an instrument is often complicated by large variations in heat output or thermal load by the instrument, i.e., the heat which must be removed or dissipated to maintain the instrument within the desired temperature range. Spacecraft instruments often exhibit large variations in thermal load due to their operational environment, such as being periodically cycled off/on and the varying incident angle and intensity of solar or earth radiation.

The cryogenic cooling system also must avoid interfering with operation of the spacecraft instruments which typically are highly sensitive to movement or fouling due to discharges, outgassing or the like. For example, vibrations or other movements can exceed sighting tolerances for pointing at a position on the earth, a distant body, or another spacecraft. Moreover, cryogenic cooling system design for space environments is complicated by the fact that the cryogenic cooling system normally undergoes significant gravitation variations in terms or strength or orientation due to factors such as movement relative to the earth or other bodies and spacecraft attitude variations. Spacecraft cryogenic cooling systems must also be compact to fit within a designated spacecraft area and have a mass that is within mission requirements, i.e., that does not unduly increase propellant requirements for launching and maneuvering or decrease payload capacity. Additionally, for many space applications, the cryogenic cooling system must operate for extended periods without human physical intervention.

One known method of cooling an instrument to cryogenic temperatures which has been employed in the space environment involves mounting the instrument on a conductive lead that is cooled by a cryogenic cooling source. The lead may include a rigid mount or a strap which is normally flexible but can become somewhat rigid under certain circumstances. Heat generated by the instrument is conducted through the lead to the cooling source. Due to cooling losses to the environment along the lead, the instrument is typically mounted in close proximity to the cooling source. However, the close proximity makes the instrument susceptible to electromagnetic interference and vibration effects created by the cooling source. For many applications, such as various satellite sensors, the effects of the cooling source can unacceptably interfere with the performance of the instrument. Additionally, for many applications, the conductive lead undergoes significant thermal contraction and expansion as it is cycled between ambient temperatures and cryogenic temperatures, resulting in a corresponding movement of the instrument which can lead to problems such as misalignment and physical stresses or fatigue on the instrument and related structure.

Another known method of cooling an instrument to cryogenic temperatures involves an open-loop cryogenic cooling system. Open-loop cooling systems have an inventory of cryogen which is used to cool the instrument to cryogenic temperatures. In some open-loop systems, the cooling effect of the cryogen is enhanced by allowing the cryogen to boil-off or vaporize thereby taking advantage of thermal absorption properties associated with the phase change. The cryogen is typically exhausted to the ambient environment after absorbing heat from the instrument. A limitation of such open loop systems is that the instrument can be maintained at cryogenic temperatures only during the time in which a supply of cryogen remains. It can be appreciated that in many applications, such as satellite sensors, it is not practical to replenish the inventory of cryogen. Additionally, acceptable cooling system lifespans for many satellite applications would require an unacceptable initial mass of cryogen inventory. Thus, due to the limited operational time of certain open-loop cryogenic cooling systems, these systems are impractical for many space-related and other applications.

A proposed alternative to the open-loop cooling system is a closed-loop cooling system wherein the cryogen is recovered by the cooling system for re-use. Such closed-loop systems have the theoretical advantage of extended useful life because the cryogen is not rapidly exhausted. However, significant obstacles remain with respect to fully realizing these theoretical benefits in a cryogenic system which maintains accurate temperature control of an instrument which has a heat output that varies over time, while being reliable and not unduly complicated or massive.

In addition to the foregoing, known cryogenic systems are commonly subject to one or more of the following limitations relative to ground-based or space-based use.

First, certain known cryogenic cooling systems require the use of a high output or inefficient cooling source in order to maintain an instrument at a constant predetermined temperature when the heat output of the instrument varies over time. This is because these systems respond to changes in instrument temperature by changing the cooling output of the cooling source. That is, the cooling source chases the instrument's heat output. It is inefficient and problematic to vary the cooling output of the cooling source in this fashion. For example, in order to maintain a constant temperature, such cooling systems must have a cooling capacity capable of absorbing the maximum heat generated by the instrument under the most demanding scenarios. In this regard, the heat generated by satellite sensors often varies by over an order of magnitude from a maximum heat output to a minimum heat output. The maximum heat output may occur only occasionally and for short periods of time. Since existing cooling systems must be selected to accommodate the instrument's maximum heat output, there is substantial excess cooling capacity when the instrument is generating less than the maximum heat output. Moreover, "chasing" the instrument's heat output normally involves cycling or major adjustments of the cooling source which can produce vibrations, electromagnetic interference, and/or loss of efficiency.

Another common limitation of some known cryogenic cooling systems is that their cooling output is sensitive to variations in gravity. This sensitivity is due to reliance upon gravity to circulate cryogen through the system or to separate or properly locate desired phases of cryogen in the system. Variations in gravitational field, as are common in space related applications, can render such systems dysfunctional or unreliable.

A limitation, specifically related to Stirling and Pulse Tube cooling systems, is their requirement that the cold producing tip (or cold head) be placed in close proximity to the compressor. This requirement severely limits the ability to place the heat rejecting component (the compressor) near the heat sink (space radiator) and/or to isolate the vibrations of the cooler from the instrument.

Another limitation of some known cryogenic cooling systems is their use of valves that have moving parts, e.g., which vary the valve orifice opening, to control the flow of refrigerant. These valves can suffer mechanical problems at cryogenic temperatures due to substantial contraction and expansion of the moving parts as they are cycled between ambient and cryogenic temperatures. Further mechanical problems are created at cryogenic temperatures when the circulating refrigerant forms deposits on the moving parts.

Known cryogenic systems also commonly service only a single instrument. As can be appreciated, satellites and other electronics platforms often include multiple cryogenic instruments. As a result, it is not uncommon to provide multiple cryogenic cooling systems, each adjacent to a corresponding instrument. It would be useful to reduce the amount of equipment dedicated to cooling. In addition, it would be advantageous to allow for separation of the heat producing instruments from the cryogenic cooling source.

SUMMARY OF THE INVENTION

Accordingly, objectives of the present invention include the following:

To provide a cryogenic cooling system that allows for physical separation of a cooling source from an instrument to be cooled thereby substantially limiting undesirable effects of the cooling source on the instrument and enhancing efficiency.

To provide a cryogenic cooling system that accurately maintains an instrument with a time varying heat output at a substantially constant predetermined temperature.

To provide a cryogenic cooling system which allows for delivery of a cooling output to the instrument at a rate independent of the cooling output rate of the cooling source thereby allowing for greater cooling efficiency.

To provide a cryogenic cooling system that maintains an instrument at a predetermined temperature with a cooling source that has a substantially constant cooling output.

To provide a cryogenic cooling system whereby the pressure and flow of cryogen to an instrument is controlled in response to sensed temperature of the instrument.

To provide a closed-dual-loop cryogenic cooling system which allows for accurate and convenient control of instrument temperature.

To provide a cryogenic cooling system whereby more than one instrument is maintained at a predetermined temperature by a shared cooling source.

To provide a cryogenic cooling system substantially insensitive to gravitational variations.

To provide a cryogenic cooling system that controls a flow of cryogenic temperature refrigerant using a regulator that does not have moving parts.

Additional objectives will be apparent upon consideration of the following description.

According to one aspect of the present invention, a cooling system is provided that maintains an instrument with a time varying heat output at a constant predetermined temperature. The cooling system includes a cooling source, a flow path for flowing a refrigerant to the instrument, and a thermal capacitor that allows for delivery of a cooling output to the instrument via the refrigerant at a rate that can be varied relative to the output of the cooling source depending, for example, upon the heat output of the instrument. That is, the cooling power, or potential to absorb thermal energy per unit time, output by the thermal capacitor can be different from the cooling power output by the cooling source at a given time. In this regard, it will be appreciated that cooling power output is affected by various factors including the heat output by the instrument to the cooling system, temperature of a fluid refrigerant or other medium, heat exchange interface surface area, vapor pressure at the heat exchange interface, flow rate of the refrigerant, thermal conducting properties of the medium and/or phase changes of the refrigerant, e.g., thermal absorption attendant to boiling-off of liquid refrigerant.

The cooling source can be a system for generating a cooling output that is sufficient to cool and maintain the instrument at a constant predetermined cryogenic temperature in cooperation with the thermal capacitor and related components. For example, the cooling source can be selected from cryogenic cooling sources which are well known in the art, such as a Stirling Cycle, a Pulse Tube, a Reverse Brayton Cycle, and/or a Joule Thomson or Sorption cooling source. The cooling output required from the cooling source is determined by factors such as the temperature to which the instrument is to be cooled, the heat output by the instrument, the efficiency and rate at with which cooling output is delivered to the instrument, and the ambient temperature of the environment. It is an advantage of the present invention that the cooling source can be operated to provide a substantially constant cooling output thereby avoiding vibrations, electromagnetic effects, and inefficiencies that can be associated with changing the cooling output of a cooling source. This substantially constant cooling output over a given time period can be substantially less than the maximum heat output of the instrument over the same time period, thereby allowing for use of a lower power cooling source and enhancing efficiency.

The thermal capacitor receives the cooling output from the cooling source, stores cooling energy and releases the cooling energy to the instrument as needed or desired. The thermal capacitor thus includes a material or system that has a capacity to accumulate a thermal energy and output a varying thermal energy relative to the output of the cooling source. For example, the thermal capacitor can include a solid material such as a metal, a liquid, a frozen refrigerant, or a cryogen which alternately freezes and thaws. In the latter regard, various elements (e.g., argon, oxygen, nitrogen), mixtures of elements or compounds (e.g., methane, carbon dioxide) can be employed.

One embodiment of the thermal capacitor includes a reservoir of a cryogen. The reservoir is cooled by the cooling source and releases a cooling output to the circulating refrigerant (i.e., absorbs heat) at a rate which depends on the thermal load of the instrument. Heat output variations from the instrument result in heat absorption variations in the refrigerant at the instrument's heat exchanger interface. These variations result in corresponding variations in the cooling output of the reservoir, for example, due to variations in the mass rate of thawing of a reservoir cryogen and commensurate variations in the release rate of the reservoir's latent heat of fusion. In this manner, the thermal capacitor compensates for heat output variations from the instrument while the cooling source can supply a substantially constant cooling output.

In another embodiment, the thermal capacitor includes a first chamber, a second chamber, a conduit connecting the chambers, and an adsorbent material and an adsorbate fluid within the first and second chamber. The adsorbent material can include activated charcoal while the adsorbate fluid can include a gas such as nitrogen. The cooling source cools the first chamber by removing the heat of adsorption of the adsorbate fluid with the adsorbent material. The first chamber cools the circulating refrigerant by desorbing the adsorbate fluid from the adsorbent material. The second chamber is cooled by refrigerant recovered from the thermal interface. Adsorbate fluid that is desorbed in the first chamber flows through the conduit to the second chamber where it is adsorbed. In this manner, the thermal capacitor stores cooling energy from the cooling source at one rate and releases the cooling energy to the instrument as needed or desired.

The flow system provides a path for delivering a cooling output, e.g., via a fluid refrigerant, to the instrument. This refrigerant flow can be accomplished through a closed-loop system or an open-loop system. For many applications, a closed-loop system as described below is advantageous as the refrigerant is conserved and certain control advantages are provided. The flow system can include a network of conduits through which the refrigerant flows between the cooling source and the instrument. Additionally, the system can further include an apparatus for regulating a flow parameter (e.g., mass flow rate or vapor pressure) of refrigerant at the instrument. It will be appreciated that the vapor pressure and temperature at the interface are interrelated. Accordingly, temperature at the interface can be controlled by regulating vapor pressure. The apparatus for regulating a flow parameter of the refrigerant can include, for example, a mechanical and/or non-mechanical regulator for adjusting a flow rate and pressure of the refrigerant, a mechanism that adjusts the flow of refrigerant between a primary loop and a bypass loop, or any suitable mechanism for controlling pressure or temperature.

For example, the apparatus for adjusting a flow parameter of the refrigerant can include a by-pass circulation line, a by-pass regulator, and a temperature control circuit. The by-pass circulation line provides a flow path that does not include the instrument. The temperature control circuit cooperates with the by-pass regulator in order to adjust the flow of the refrigerant which circulates through the by-pass circulation line. In this manner, the amount of refrigerant provided to the instrument and the interface pressure is varied in order to maintain the instrument at a predetermined temperature.

The apparatus for adjusting the flow parameter of refrigerant can also include a non-mechanical regulator, such as a region of expanding conduit cross-section or a so-called Joule Thomson expansion, interposed in the circulation path, a heater for heating the refrigerant flowing through the regulator, and a temperature control circuit. The temperature control circuit adjusts the heater to increase or decrease the heat added to the refrigerant within the regulator region in response to a sensed temperature of the instrument. Addition of heat to the refrigerant decreases the density of the refrigerant, thereby creating a resistance that slows the flow of refrigerant through the regulator to the instrument. That is, the addition of heat tends to vaporize a portion of the refrigerant thereby reducing density. Because the pressure gradient across the regulator is substantially fixed for particular flow conditions (e.g., pump pressure and bypass valve setting), the density reduction results in a reduced mass flow of refrigerant across the regulator. Any suitable means for providing such a resistance can be utilized. In this manner, the heat exchanger interface vapor pressure can be controlled and the amount of refrigerant available for boiling-off at the instrument interface can be varied to avoid dry-out during peak load periods. It will thus be appreciated that the regulator can regulate the refrigerant flow and interface pressure without mechanically altering the flow area, i.e., without employing moving parts such as a variable orifice to physically change the flow line/path.

According to another aspect of the present invention, a cooling system is provided that maintains more than one instrument with a time varying heat output at a constant predetermined temperature. The cooling system includes a cooling source, a circulation line associated with each instrument for delivering refrigerant to each instrument, and an apparatus for regulating flow and pressure parameters in each circulation line. The cooling system can further include a thermal capacitor that allows the combined rate at which a cooling output is delivered to the instruments to be independent of the rate at which a cooling output is supplied from the cooling source.

In one embodiment, the apparatus for regulating the flow and pressure parameters includes a regulator associated with each circulation line, a heater associated with each regulator for heating the refrigerant flowing through each regulator, an additional control valve, and a temperature control circuit. The temperature control circuit independently adjusts each heater to increase or decrease the heat added to the refrigerant within the corresponding regulator in response to a sensed temperature of the corresponding instrument and additionally operates the additional control valve to provide independent control of the separate circulation lines. In this manner, the cooling system maintains more than one instrument with a time varying heat output at a constant predetermined temperature while sharing the cooling source. As can be appreciated, this cooling system is easily adapted to maintain numerous instruments at independent predetermined temperatures.

BRIEF DESCRIPTION OF THE DRAWINGS

For a more complete understanding of the present invention and further advantages thereof, reference is now made to the following Detailed Description, taken in conjunction with the Drawings, in which.

DETAILED DESCRIPTION OF THE INVENTION

In the following description, the present invention will be described in relation to exemplary embodiments for a closed-loop cryogenic cooling system although various aspects of the invention are applicable to other refrigeration systems. The component parts of two embodiments of a closed-loop cryogenic cooling system will be described first. Next, the thermodynamic operation of such a system will be described through an example. A third embodiment of the invention will then be described whereby more than one instrument having a time varying heat output is maintained at a constant predetermined temperature. Finally, a further embodiment of the invention including a sorption thermal capacitor will be described.

Figure 1:
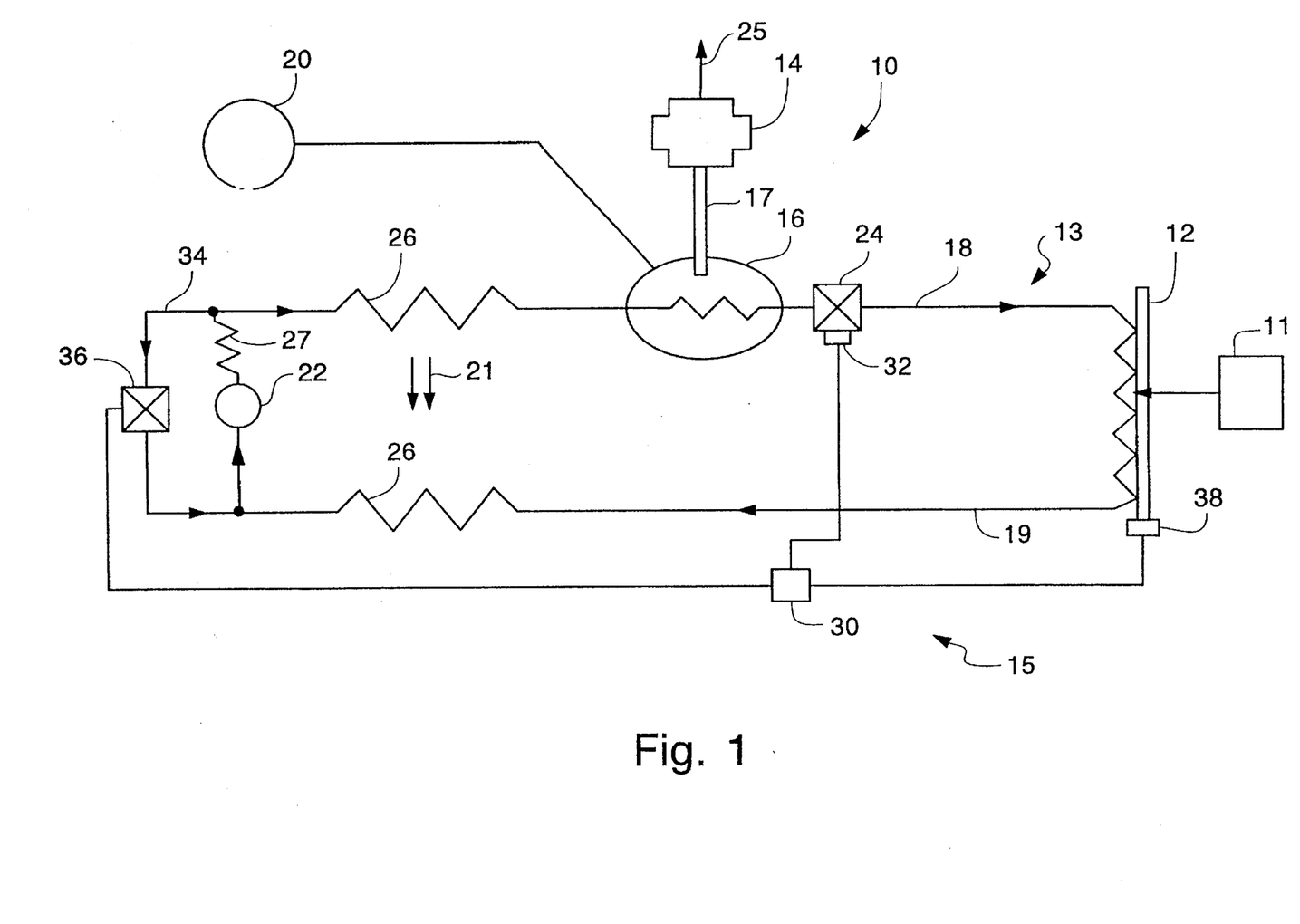
FIG. 1 is a schematic diagram of a cryogenic cooling system according to the present invention for maintaining an instrument with a time varying heat output at a substantially constant predetermined temperature.

Referring to FIG. 1, there is shown a schematic diagram of a cryogenic cooling system 10 constructed according to the principles of the present invention. The cryogenic cooling system 10 maintains an instrument 11 with a time varying heat output at a constant predetermined temperature. Generally, the system 10 includes a cryogenic cooling source 14, a circulation system 13 for circulating a fluid refrigerant to the instrument 11 via a closed-loop path, a thermal capacitor 16 for providing a variable thermal output as needed, and a control system 15 for regulating refrigerant flow in response to instrument temperature feedback.

The instrument 11 receives a cooling output from the cryogenic cooling system 10 and thereby dissipates heat through a cooling mount 12. The cooling mount 12, which may comprise a heat exchange plate, is formed from a thermally conductive material and can be shaped to maximize heat flow from the instrument 11 to the cryogenic cooling system 10. As will be understood from the description below, heat is transferred from the cooling mount 12 to the circulation system due to thermal contact. Preferably, the refrigerant is provided to the mount 12 at or near its boiling point, e.g., as a two-phase mixture, so that heat dissipation is enhanced by boiling of the refrigerant.

In the illustrated embodiment, the circulation loop 13 is depicted as progressively flowing a refrigerant from one end of the mount 12 to another. If desired, the refrigerant can be introduced to the mount 12 at more than one location to enhance even cooling across the mount 12. It is an advantage of the present invention that the cooling system interface can be accomplished using a flexible, lightweight cooling coil, thereby eliminating in the instrument area the bulky and stiff heat collectors such as heat pipes, conducting buss bars and load tanks associated with certain conventional systems. The potential for interference with sensitive instruments is thereby reduced.

The cryogenic cooling system 10 derives its primary cooling capacity from cooling source 14. In the illustrated cryogenic system, the cooling source 14 is a conventional cryogenic cooling source, such as a Stirling, Pulse Tube, Reverse Brayton, or Joule Thomson system. According to the present invention, the cooling source 14 can be operated in a steady-state mode, that is, under constant power load such that the source extracts heat from the system 10 at a substantially constant rate. In other words, the source 14 provides a cooling potential or output at a substantially constant rate. This advantageously allows for greater system efficiency and reduced risk of instrument interference. As generally indicated by arrow 25, the source 14 discharges heat to the ambient environment, e.g., via a space radiator. The cooling source output is communicated to the remainder of the system by output lead 17. The lead 17 can be a conventional heat collector such as a heat pipe or conducting buss bar or any other suitable heat transfer device.

The cooling source 14 supplies a cooling output at a first rate via lead 17 to a thermal capacitor 16. The thermal capacitor 16 stores a cooling potential and releases a cooling output to the circulation system 13 at a second rate which can be varied relative to the output rate of the cooling source 14. The capacitor 16 thus allows the system 10 to deliver an output which can be varied to substantially match the varying thermal load of instrument 11.

In the illustrated embodiment, this thermal capacitance is provided by way of a receptacle containing a cryogenic material which stores a cooling potential by means of a change of phase. Specifically, the cryogenic material of the illustrated embodiment is a fluid which can be frozen at the operating temperature of the source 14. During periods of low instrument thermal load and, hence, low cooling system output, the cryogenic material stores a cooling potential as its latent heat of fusion is removed. In high load periods, this cooling potential is realized by release of the latent heat of fusion.

The cryogenic material can be selected based on the operating temperature of the source 14 or system 10 to provide the desired fusion storage capability and to minimize pressure requirements. For example, at 65° K., copper has a heat capacity of about 0.14 joules per gram per degree K. Therefore, for an operating temperature range of, for example 3° K., copper can release about 0.42 joules per gram of cooling energy. As a result, a relatively large mass of copper would be required for many applications.

A greater cooling energy per unit mass can be achieved by taking advantage of a phase change energy. A solid to liquid phase change offers the additional advantage for certain applications of avoiding the need to handle large quantities of gas associated with significant mass liquid to vapor transitions.

Figure 5A:
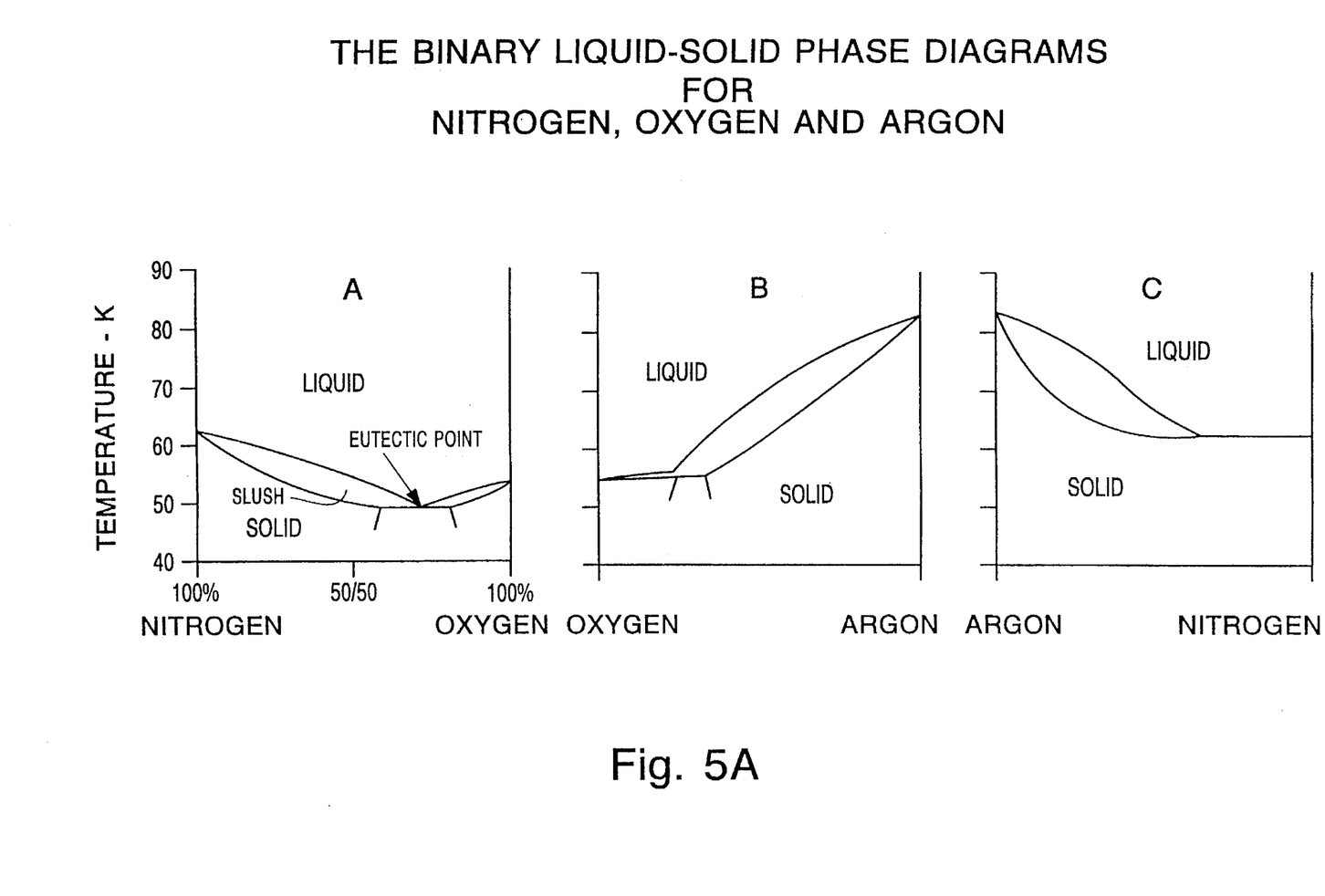
FIGS. 5(a)–5(c) show freezing/thawing characteristics for various combinations of argon, oxygen and nitrogen.
Figure 5B:
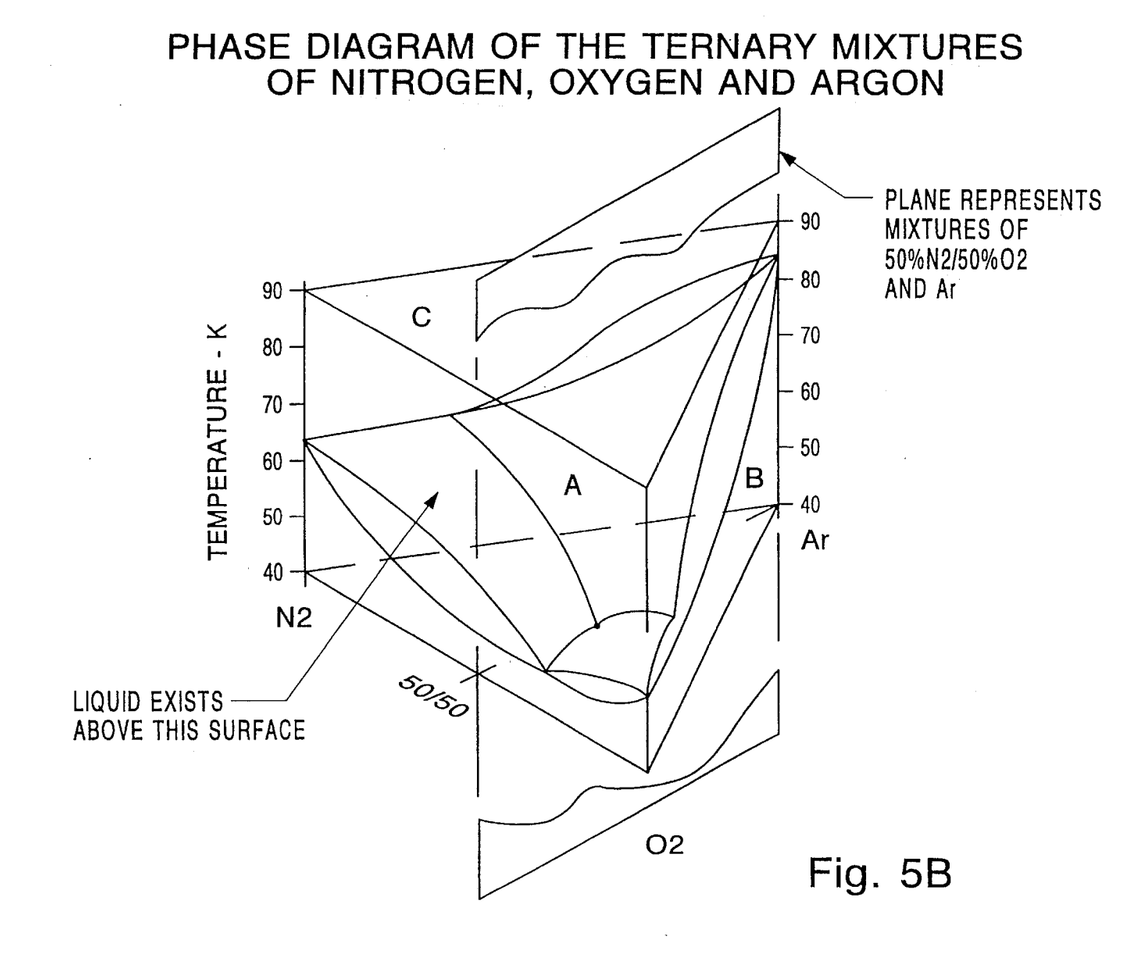
Figure 5C:
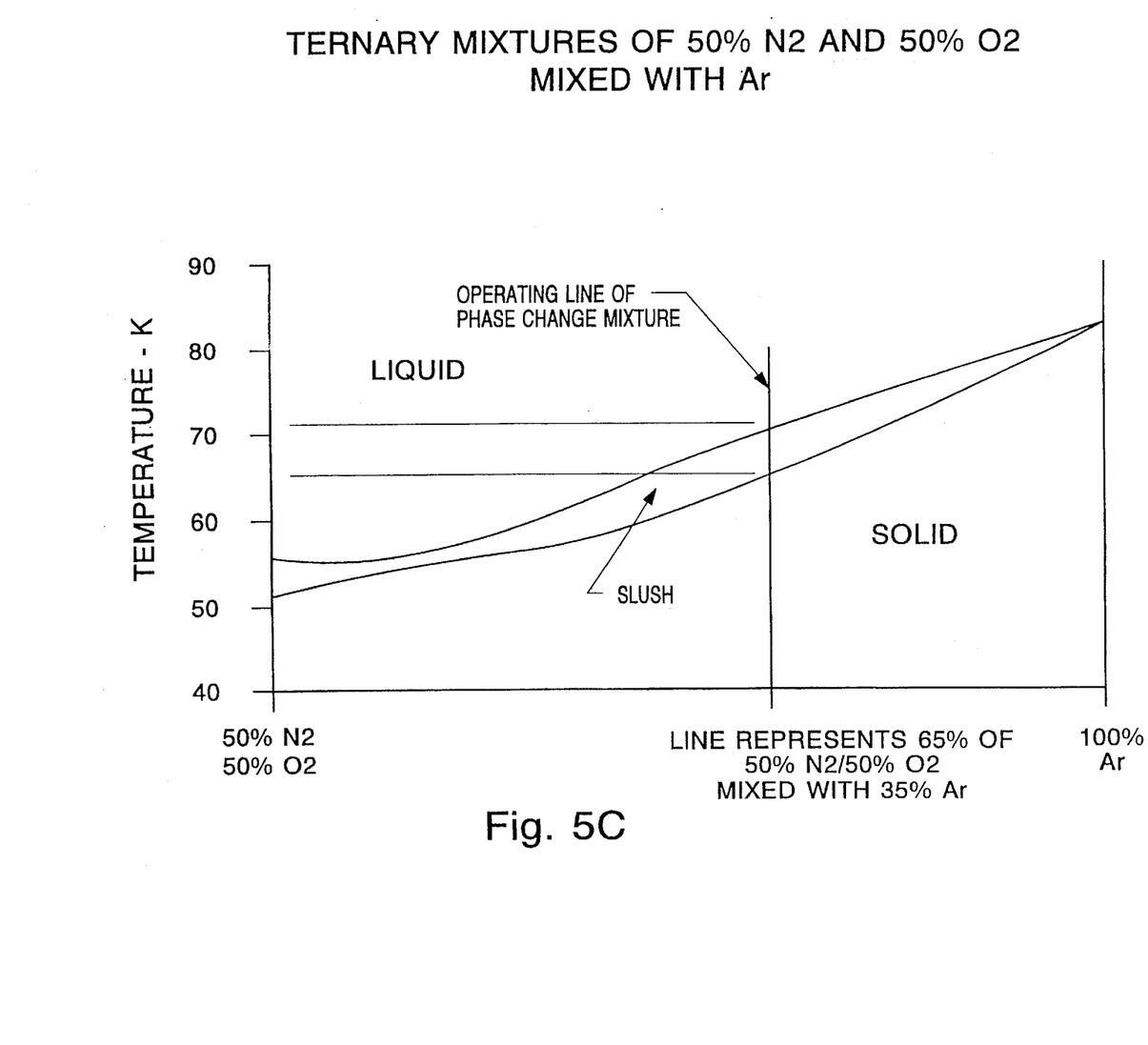

For certain operating temperature ranges, it has been found that a mixture of materials can be usefully employed. For example, no known elements or compounds melt in the temperature range 67° K. to 70° K. In this regard, FIG. 5(a) shows the freezing/thawing properties for binary combinations of oxygen, nitrogen and argon. The figures indicate that acceptable results may be obtained with certain mixtures of nitrogen and argon or oxygen and argon. However, as shown in FIG. 5(b), particularly advantageous results can be obtained for this temperature range by employing a ternary mixture of the three elements. The vertical plane illustrated in FIG. 5(b) indicates mixtures of argon with a submix of 50% oxygen and 50% nitrogen. FIG. 5(c) shows a phase diagram relative to this plane. As can be seen in FIG. 5(c), excellent results for the desired temperature range can be achieved using a mixture of 35% argon with 65% of the oxygen-nitrogen submix. The illustrated thermal capacitor 16 includes such a mixture of argon, oxygen, and nitrogen contained within a vessel that is cooled to a slush or frozen state of the mixture by the cooling source 14.

Referring again to FIG. 1, warm gas receptacle 20 accommodates expansion of the cryogen material in capacitor 16. At ambient temperatures, the cryogen material is primarily contained within the warm gas receptacle 20. As the cryogen material is cooled to cryogenic temperatures, a pressure differential is created between the warm gas receptacle 20 and the capacitor 16 thereby drawing cryogen material into the capacitor 16.

A cooling output is supplied from the thermal capacitor 16 to the cooling mount 12 by the refrigerant circulation system 13. The circulation system 13 provides a closed-loop path for delivering refrigerant from the capacitor 16 to the cooling mount 12. As will be more fully understood from the description below, the rate of refrigerant flow and pressure at mount 12 can be varied depending on the thermal load of the instrument 11. Generally, the circulation system 13 includes supply line 18 for conveying a supply of refrigerant from low pressure pump 22 to cooling mount 12 via the capacitor 16 and recovery line 19 for receiving the effluent refrigerant from the cooling mount 12 and returning the refrigerant to the inlet of pump 22. The system also includes a bypass line 34 and various temperature and flow control elements as will be discussed below. The supply line 18 provides physical separation between the cooling source 14 and the instrument attached to the cooling mount 12. In this manner, heat rejection from the system 10 can be improved in the spacecraft environment by placing cooler hardware near a space radiator.

The refrigerant is circulated through the circulation loop 18 by a pump 22. The pump 22 raises the pressure of the refrigerant to maintain the circulation of refrigerant and to facilitate condensation of the refrigerant to a liquid phase by the thermal capacitor 16. The circulation of refrigerant under the pressure generated by the pump 22 makes the flow of refrigerant to the instrument 11 substantially independent of the effects of gravity. This is an advantage, for certain applications, over prior art systems which rely on gravity or surface tension to provide proper refrigerant delivery or phase location within the system. In accordance with the present invention, a low-pressure pump, for example, a pump providing an output pressure of from about 6 PSIA to 50 PSIA provides adequate circulation for a variety of cryogenic applications, depending on thermal load, operating temperature, the refrigerant and cryogenic materials involved, and other thermodynamic variables.

The compressed refrigerant exiting the pump 22 can have a temperature above the ambient temperature. An ambient heat exchanger 27 is therefore used to transfer heat from the refrigerant to the ambient environment as a pre-cooling step, in advance of delivery to the thermal capacitor 16, to enhance efficiency. The ambient heat exchanger 27 can conveniently be provided by way of a conductive coil, interposed in the delivery line 18, which is exposed to the ambient environment for heat dissipation. The refrigerant exiting the ambient heat exchanger 27 is further cooled by a recuperative heat exchanger 26 which transfers heat to the refrigerant entering the pump 22 as generally indicated by arrows 21. The recuperative heat exchanger 26 can comprise portions of the delivery line 18 and recovery line 19 which are in thermal contact, for example, due to a concentric line arrangement wherein heat exchange occurs about the entire periphery of the inner line. From the heat exchanger 26, the cooled refrigerant is delivered to the thermal capacitor 16 for further cooling and condensation. The cooling can be accomplished by way of heat exchange coils in thermal contact with the thermal capacitor 16.

In the illustrated embodiment, the operating temperature of the thermal capacitor 16 and the refrigerant are selected such that the refrigerant is cooled by the capacitor 16 to below its boiling point, preferably by no more than a few degrees Kelvin. The refrigerant exiting the capacitor 16 is therefore a cryogenic liquid. To provide proper cooling of the cooling mount 12, the refrigerant pressure at mount 12 is controlled. As will be readily appreciated, mechanical valves with moving parts can malfunction at such cryogenic temperatures. Accordingly, the illustrated embodiment employs a non-mechanical fluid regulator 24 to regulate the refrigerant flow by providing a variable resistance to flow.

The non-mechanical regulator 24 of the illustrated embodiment includes a Joule-Thomson expansion region associated with a restriction in the flow line and a heater. Any suitable restriction can be employed such as a narrow orifice, a capillary tube or a porous plug. The regulator 24 of the illustrated embodiment is a capillary tube in which the gas is expanded. The capillary tube is smaller than both the inlet flow line and the exiting flow line to the capillary, but the exiting flow line from the capillary can be larger or smaller than the inlet flow line. The refrigerant is heated within the expansion region by trim heater 32 in thermal contact with the expansion region such that a mixed-phase of liquid and gaseous refrigerant is provided at the outlet of the expansion region, i.e., a portion of the refrigerant reaches its boiling point. Due to the large difference in densities of the liquid and vapor refrigerant, an increasing vapor content or ratio at the regulator 24 will progressively choke the regulator. Accordingly, the pressure at mount 12 and the refrigerant supplied to mount 12 can be non-mechanically regulated by controlling the heat input from heater 32. The associated control mechanism is described below.

The refrigerant delivered to the mount 12 is at or near its boiling temperature such that boiling-off readily occurs for efficient heat dissipation. The effluent vapor/refrigerant is communicated back to the inlet of pump 22 via recovery line 19 and heat exchanger 26.

The temperature of the instrument 11 is maintained at a constant predetermined temperature by a control system 15, including controller 30, the trim heater 32, a by-pass line 34, a by-pass valve 36, and a temperature sensor 38. The temperature sensor 38 can be selected from sensors which are well known in the art which accurately measure cryogenic temperatures.

In response to a sensed temperature by the temperature sensor 38, the controller 15 adjusts the temperature of the instrument 11 by adjusting the pressure of refrigerant in the return line 19 from the cooling mount 12. The flow of refrigerant through the supply line 18 is partially controlled by adjusting the by-pass valve 36 which adjusts the relative amounts of refrigerant flowing through the supply line 18 and the by-pass line 34. The flow of refrigerant through the supply line 18 is further controlled by adjusting the heater 32 which is in thermal communication with the regulator 24. As previously discussed, a decrease in refrigerant flow through the regulator 24 is achieved by increasing the temperature of the refrigerant using the heater 32, thereby creating an increased resistance which decreases the flow of refrigerant. Due to the significant difference in density between gas and liquid refrigerant and the proximity of the refrigerant to its boiling point, a small amount of heat generated by the heater 32 can make a substantial decrease in the refrigerant flow.

The illustrated controller 15 includes logic circuitry for controlling the heater 32 and valve 36 to regulate the pressure and flow of the fluid flowing past the mount 12 according to theoretically or empirically derived parameter criteria. For example, when the mount is above a selected temperature, the controller 15 can close the bypass valve 36 and "close" the regulator 24 to decrease refrigerant pressure at the mount 12. During periods of low thermal load, the regulator 24 can be adjusted to decrease flow. Preferably, the control system 30 maintains a substantially constant pressure of refrigerant at the high pressure side of pump 22 by adjusting the by-pass valve 36 in response to the resistance generated by the heater 32. To insure against dry-out of the refrigerant supplied to the mount 12, appropriate limits on system operation can be programmed into the controller 15 or a refrigerant sensor can be provided at mount 12 to provide direct feedback to controller 15. It will be appreciated that the present invention therefore allows for substantially steady-state operation of the pump 22, thereby enhancing efficiency and durability.

The following prophetic example is provided to assist in describing the thermodynamic aspects of this embodiment. For this example, a spacecraft sensor application is assumed where the sensor is cooled to 65° K. from an ambient temperature of 300° K. The cooling source 14 operates at about 66° K. That is, the thermal capacitor 16 contains a mixture of argon, oxygen, and nitrogen which has a freezing range temperature about 66° K.–70° K. The refrigerant is nitrogen. The nitrogen, in a gas phase, is compressed to at least about 6 PSIA by the pump 22 to enable liquefaction of the nitrogen by the thermal capacitor 16. The mixture of gases in the capacitor 16 is selected to allow low pressure operation of the pump 22. In this regard, if the thermal capacitor 16 contained only argon, which has a triple point temperature of 84° K., then the nitrogen would need to be compressed to at least 34 PSIA to enable liquefaction by the thermal capacitor 16.

The warmed compressed nitrogen exiting the pump 22 is cooled to ambient temperature by the ambient heat exchanger 27. The nitrogen gas is then cooled at constant pressure in the recuperative heat exchanger 26. The cooled nitrogen is then condensed to a liquid phase by constant temperature heat exchange with the mixture of argon, oxygen, and nitrogen in the thermal capacitor 16. The liquid nitrogen is expanded at constant enthalpy through the regulator 24 to 2.5 PSIA providing a mixture of gas and liquid nitrogen. The nitrogen mixture absorbs heat from the cooling mount 12 primarily through boiling of the liquid nitrogen at 65° K. The resulting warmed nitrogen is circulated to the recuperative heat exchanger 26, where it absorbs heat from the nitrogen exiting the pump 22, and then to the pump 22.

Figure 2:
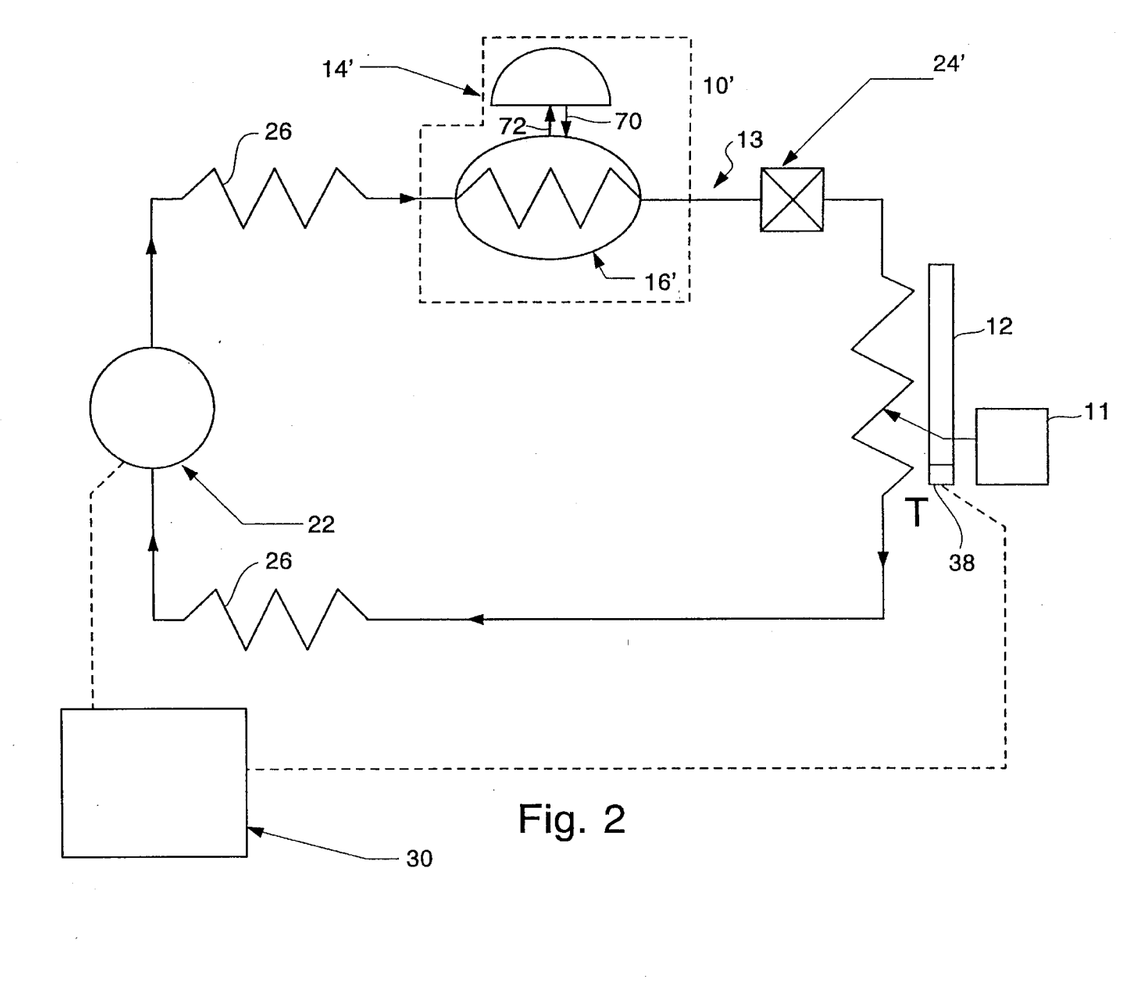
FIG. 2 is a schematic diagram of another embodiment of a cryogenic cooling system according to the present invention.

FIG. 2 shows another and somewhat simpler embodiment of a cooling system 10' which may be advantageously employed for various cryogenic cooling applications. In this embodiment and the following embodiments, components which are similar or identical to the corresponding components of FIG. 1 are identified by like numerals. Notably, this embodiment does not include the trim heater 32 and bypass loop 34 of FIG. 1 to control refrigerant flow and pressure at the mount 12. Instead, pressure and hence temperature at the mount 12 is controlled by adjusting the speed of pump 22. In this regard, the refrigerant flow may be higher than necessary to absorb the load during low load periods and approximately equal to the minimum required for high load periods. It should be noted that any excess cooling capacity is not merely wasted, but is substantially recovered via the recuperative heat exchanger 26.

FIG. 2 also illustrates an alternative embodiment 14' of the cooling source. The cooling source 14' includes a conventional Joule Thomson cryocooler which makes liquid cryogen internally. In accordance with the present invention, the internal or other plumbing of the Joule Thomson cooler can be expanded to include reservoir 16' associated with circulation system 13 rather than providing a separate reservoir. It will thus be appreciated that the expanded plumbing will include, in addition to reservoir 16', liquid supply line 70 to supply cryocooler liquid to reservoir 16' and gas return line 72 to return boil-off gas to the cryocooler and thereby close the cryogen flow loop. A cooling potential is stored in reservoir 16' during low load periods by accumulation of reservoir fluid from the cryocooler. This potential is released during high load periods due to boiling of the cryogen and concomitant release of the latent heat of vaporization.

Figure 3:
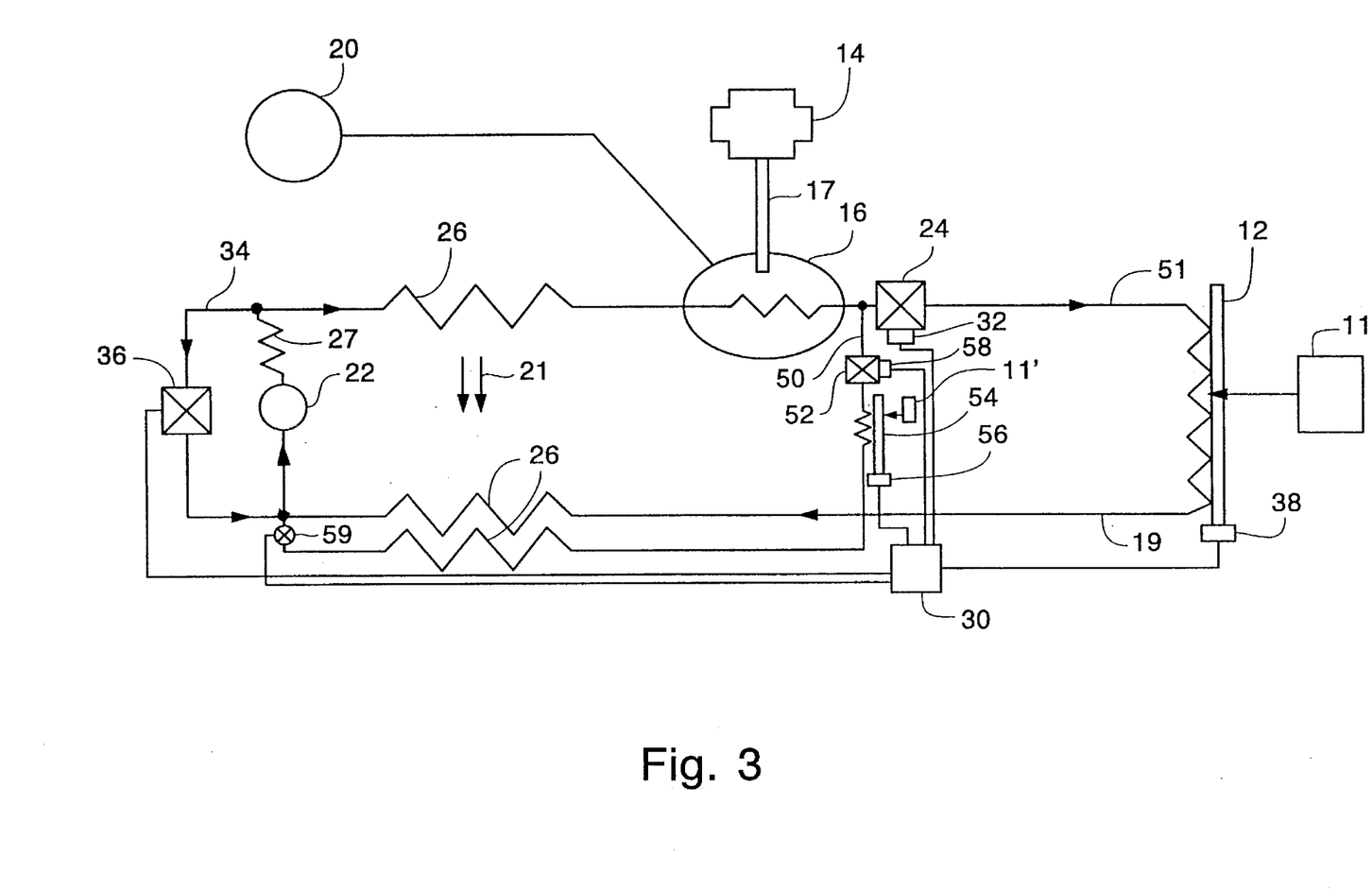
FIG. 3 is a schematic diagram of a further embodiment of a cryogenic cooling system according to the present invention for maintaining two instruments with time varying heat outputs at substantially constant predetermine temperatures.

Referring to FIG. 3, an alternative embodiment of the present invention is shown. According to this embodiment, more than one instrument 11 and 11' having a time varying temperature output can be maintained at a constant predetermined temperature selected for each instrument 11, 11' by using parallel cooling paths 19 and 51 with associated refrigerant flow control assemblies for each instrument 11, 11'. In addition to the components previously described, this embodiment includes a second circulation loop 50, a second regulator 52, a second heater 58, a second cooling mount 54, and a second temperature sensor 56 and an additional control valve 59. The second instrument 11' is cooled by the second cooling mount 54. Refrigerant is circulated from the thermal capacitor 16 to the second cooling mount 54 through the second circulation loop 50.

The temperature of the instrument 11' is sensed by the second temperature sensor 56. In response to the sensed temperature, the control system 30 adjusts the pressure and flow of refrigerant through the parallel circulation path 51 from the first cooling mount 12. The pressure of refrigerant through the second circulation path 50 is primarily controlled by adjusting the additional control valve 59 and the second heater 58 to adjust the resistance created to the flow of refrigerant through the second regulator 52. The flow of refrigerant through the first circulation loop 50 is further controlled by adjusting the by-pass valve 36 which adjusts the amount of refrigerant flowing through the first circulation loop 50 and the by-pass loop 34.

Figure 4:
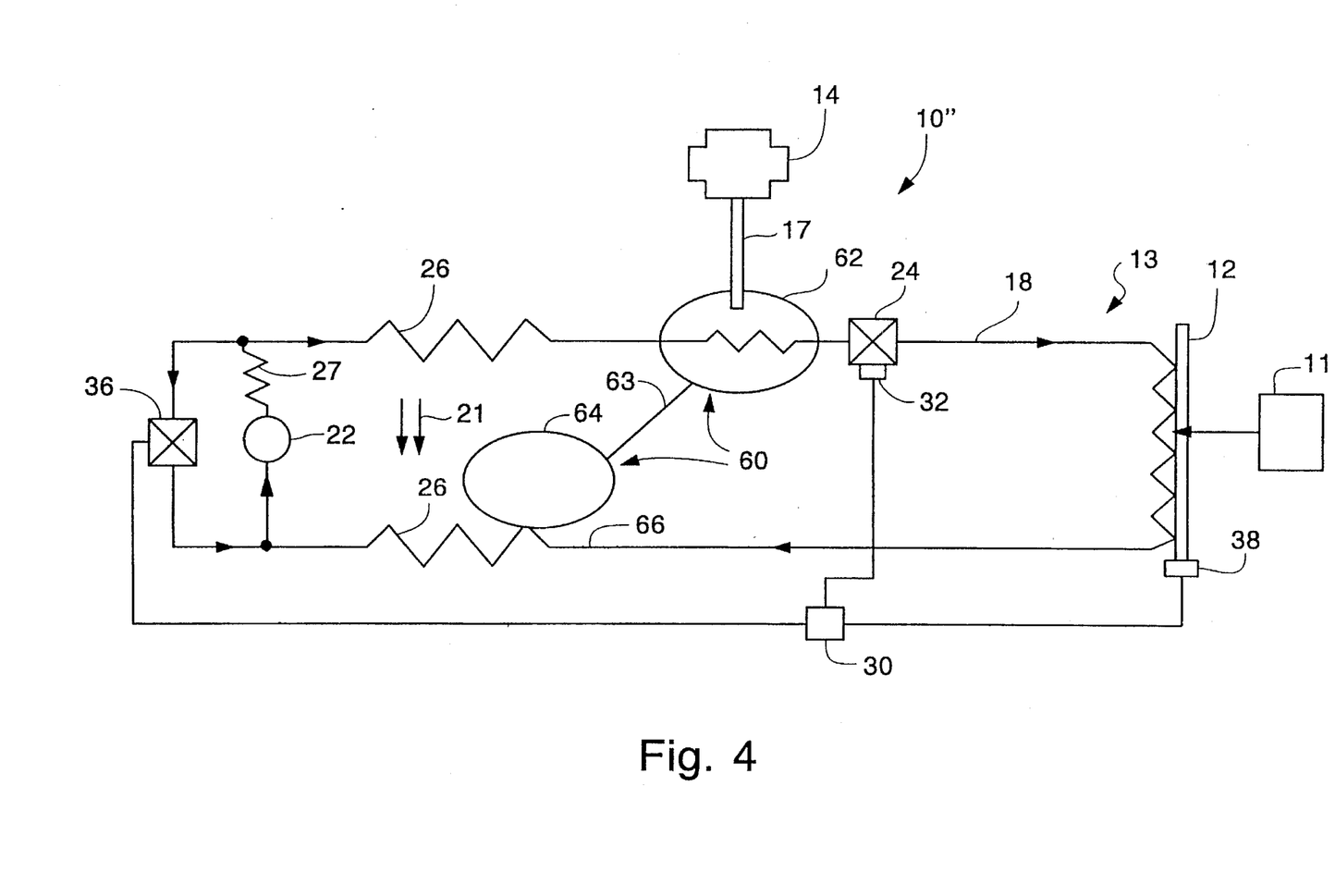
FIG. 4 is a schematic diagram of a still further embodiment of a cryogenic cooling system according to the present invention.

Referring now to FIG. 4, a cryogenic cooling system 10" is shown which includes an alternate embodiment of the thermal capacitor 16 shown in FIG. 1. In this embodiment, the solid/liquid transition of the previously described capacitor 16 and the associated heat of fusion storage potential is replaced by an adsorption/desorption mechanism. The illustrated thermal capacitor 60 includes a first chamber 60 in a heat exchanging relationship with the cooling source 14, a second chamber 64 in a heat exchanging relationship with a refrigerant flowing through heat exchanger 26 in a return flow path 66 of the circulation system 13, and an exchange path 63, such as a conduit, between the first chamber 62 and the second chamber 64. Each of the first chamber 62 and the second chamber 64 includes an adsorbent, such as activated charcoal and an adsorbate fluid which, in the case of the 65° K. application discussed above, can be nitrogen.

During periods of low thermal load, the first chamber adsorbs nitrogen from the second chamber as a result of the excess of cooling capacity of the cooler 14. That is, the cooling source 14 removes the heat of absorption of nitrogen flowing through the exchange path 63 from the second chamber 64. A reserve cooling potential is thereby stored in the first chamber 62.

During periods of high load, there is a relatively large flow of cold refrigerant in the return flow path 66 which cools the second chamber 64. Simultaneously, nitrogen is desorbed in the first chamber 62 due to the heat load of the refrigerant flow. Consequently, the adsorbate fluid flows from the first chamber to the second chamber where it is adsorbed. This transfer of nitrogen maintains the temperature of the condensed nitrogen in the circulation system 13 fairly constant. It is an advantage of this absorption/desorption mechanism that the nitrogen in the circulation system 13 can be reduced to about 70° K. This, in turn, reduces the high side pressure of the pump 22 to about 5.9 PSIA, thereby simplifying compressor design.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A cooling apparatus for cooling an instrument which produces a thermal load that varies over time, comprising:

cooling source means for providing a first cooling output;

thermal interface means associated with said instrument for receiving heat from said instrument;

flow means for delivering a refrigerant to said thermal interface means; and thermal capacitor means, associated with said cooling source means and with said flow means, for receiving said first cooling output from said cooling source means and providing a second cooling output to said flow means, wherein said second output is variable relative to said first output.

2. The cooling apparatus of claim 1, wherein:

said cooling source means is operative for providing a substantially constant cooling output over a time period, wherein said substantially constant cooling output is less than a maximum of said thermal load of said instrument over said time period.

3. The cooling apparatus of claim 1, wherein:

said cooling source means comprises one of a Stirling Cycle, Pulse Tube, Reverse Brayton Cycle, Joule Thomson or sorption cooling device.

4. The cooling apparatus of claim 1, wherein:

said thermal interface means comprises a conductive cooling plate interposed between said instrument and said flow means.

5. The cooling apparatus of claim 1, wherein:

said instrument comprises a spacecraft sensor and said thermal interface means comprises a conductive cooling plate interfaced with said spacecraft sensor.

6. The cooling apparatus of claim 1, wherein said flow means comprises means for adjusting a refrigerant flow parameter relative to said thermal interface means whereby said instrument is maintained at a substantially constant temperature as said thermal load of said instrument varies over time.

7. The cooling apparatus of claim 1, wherein said flow means comprises a first closed-loop flow path including a delivery line for use in delivering said refrigerant to said thermal interface means and a receiving line for use in receiving refrigerant from said thermal interface means, wherein at least a portion of said received refrigerant is returned to said delivery line.

8. The cooling apparatus of claim 7, wherein said flow means further comprises:

a bypass line, separate from said closed-loop flow path, for communicating said refrigerant between said delivery line and said receiving line; and a regulator operatively associated with said bypass line for regulating a flow of refrigerant through said bypass line thereby regulating delivery of said refrigerant to said thermal interface means.

9. The cooling apparatus of claim 1, wherein said flow means comprises:

a regulator for regulating a refrigerant flow rate in said flow means, said regulator including a heater for heating said refrigerant so as to adjust said flow rate of said refrigerant.

10. The cooling apparatus of claim 1, wherein said flow means comprises:

a Joule Thomson expansion area wherein said refrigerant passes through said Joule Thomson expansion area;

a heater for heating the refrigerant passing through said Joule Thomson expansion area thereby regulating a refrigerant flow rate.

11. The cooling apparatus of claim 1, wherein said flow means comprises:

sensor means for sensing temperature of said instrument; and a control circuit, operatively associated with said sensor means, for use in regulating refrigerant flow and pressure parameters of said flow means to maintain said instrument at a substantially constant temperature as said thermal load of said instrument varies over time.

12. The cooling apparatus of claim 1, wherein:

said cooling source means is operative for cooling said refrigerant to a liquid phase and said flow means further includes means for converting said liquid phase to a mixed-phase of liquid and gas.

13. The cooling apparatus of claim 1, wherein:

said thermal capacitor means comprises a storage chamber containing a medium for storing a cooling potential.

14. The cooling apparatus of claim 13, wherein:

said medium is capable of being cooled from a fluid phase to a solid phase by said first cooling output of said cooling source means.

15. The cooling apparatus of claim 13, wherein:

said medium comprises at least a first material and a second material different from said first material.

16. The cooling apparatus of claim 13, wherein:

said medium comprises a mixture of argon, oxygen, and nitrogen.

17. The cooling apparatus of claim 1, wherein:

said flow means comprises a delivery line for use in delivering said refrigerant to said thermal interface means and a receiving line for use in receiving refrigerant from said thermal interface means and communicating said refrigerant to said delivery line; and said thermal capacitor means comprises:

a first fluid chamber in a heat-exchanging relationship with said cooling source means and said delivery line;

a second fluid chamber in a heat-exchanging relationship with said receiving line; and conduit means for communicating fluid between said first and second fluid chambers.

18. The cooling apparatus of claim 17, wherein:

one of said first and second chambers includes an adsorbent material and an adsorbate fluid.

19. The cooling apparatus of claim 1, wherein said thermal capacitor means comprises a first fluid chamber, a second fluid chamber, and a conduit for interconnecting said first and second fluid chambers.

20. The cooling apparatus of claim 1, wherein said flow means comprises means for delivering said refrigerant to a second thermal interface means associated with a second instrument.

21. The cooling apparatus of claim 7, further comprising heat exchange means for exchanging heat between said delivery line and said receiving line.

22. The cooling apparatus of claim 1, wherein said flow means comprises a pump and said apparatus further comprises:

a sensor associated with said thermal interface means for providing an indication of instrument temperature; and control means operatively associated with said pump for regulating said pump in response to said indicated instrument temperature.

23. The cooling apparatus of claim 1, wherein said cooling source comprises a Joule Thomson cooler and said thermal capacitor means comprises a fluid receptacle and means for providing two-way fluid communication between said fluid receptacle and said Joule Thomson cooler.

* * * * *